Patented June 30, 1925.

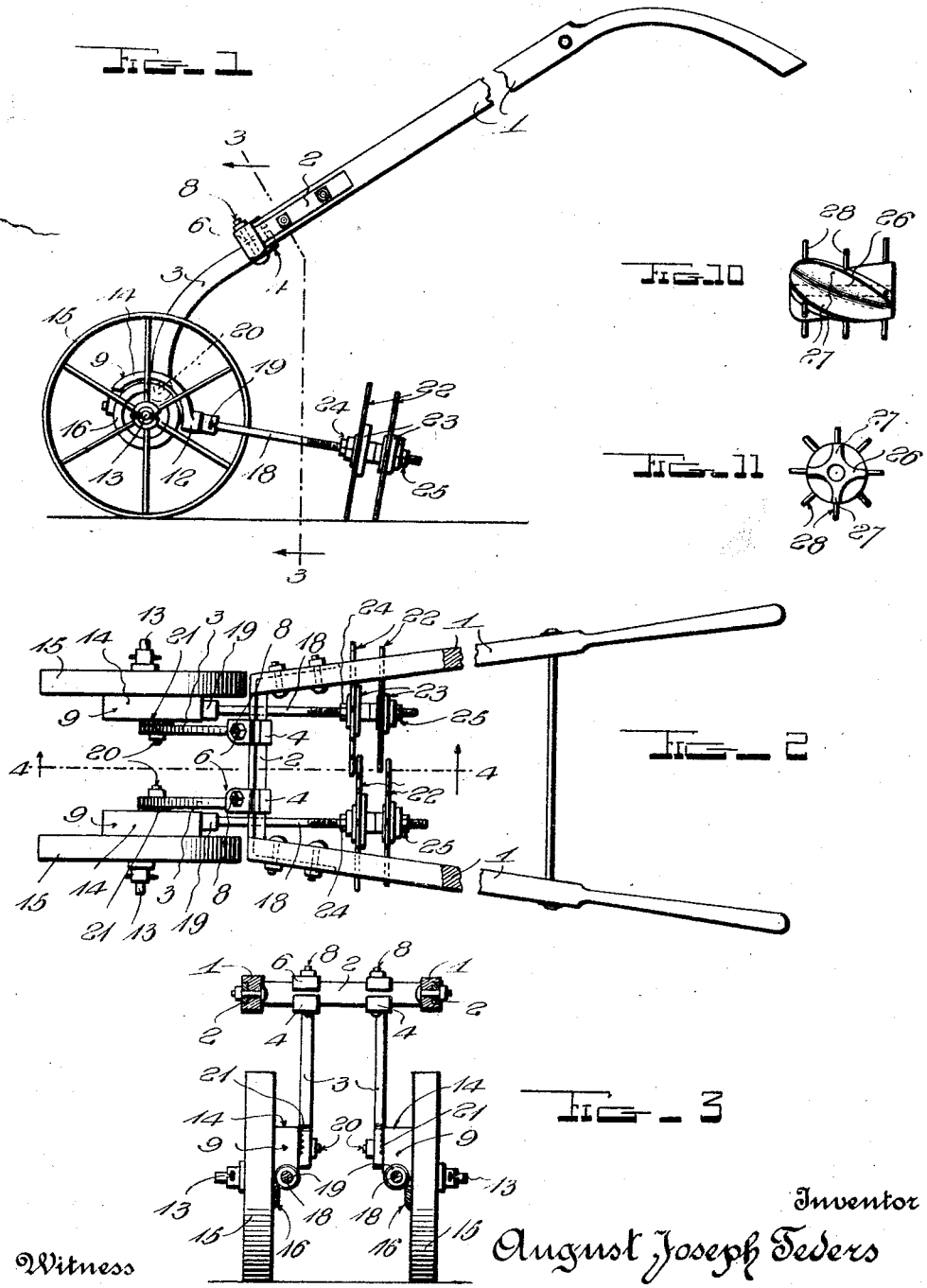

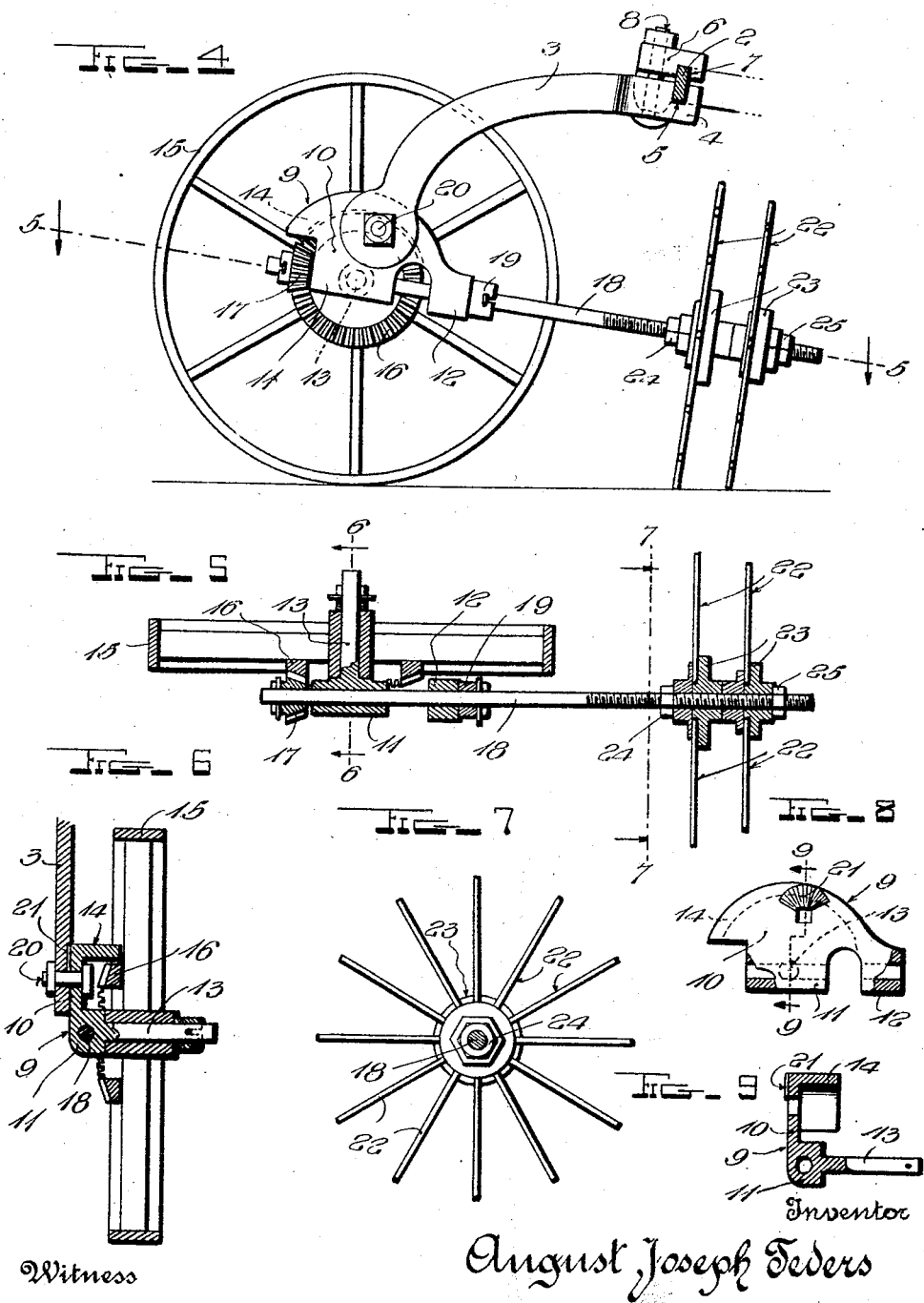

1,544,501

UNITED STATES PATENT OFFICE.

AUGUST JOSEPH TEDERS, OF KENDALLVILLE, INDIANA, ASSIGNOR OF ONE-HALF TO CLARENCE JOSEPH TEDERS.

ROTARY CULTIVATOR.

Application filed July 17, 1924. Serial No. 726,558.

*To all whom it may concern:*

Be it known that I, AUGUST JOSEPH TEDERS, a citizen of the United States, residing at Kendallville, in the county of Noble and State of Indiana, have invented certain new and useful Improvements in Rotary Cultivators; and I do declare the following to be a full, clear, and exact description of the invention, such as will enable others skilled in the art to which it appertains to make and use the same.

My invention relates to improvements in hand-operated cultivators, and the primary object of my invention is to provide a device of the class set forth which will be simple and inexpensive, yet will be efficient and in every way desirable, for cultivating along opposite sides of rows of growing crops, such as onions, the construction being such that the machine may readily be adjusted to space the right and left hand rotary cultivating implements any desired distance apart.

With the foregoing and minor objects in view, the invention resides in the novel subject matter hereinafter described and claimed, the description being supplemented by the accompanying drawings.

Figure 1 is a side elevation of a hand cultivator constructed in accordance with my invention.

Figure 2 is a top plan view.

Figure 3 is a vertical transverse sectional view on line 3—3 of Fig. 1.

Figure 4 is an enlarged longitudinal sectional view on line 4—4 of Fig. 2.

Figure 5 is a horizontal sectional view on line 5—5 of Fig. 4.

Figures 6 and 7 are vertical transverse sections on lines 6—6 and 7—7 of Fig. 5.

Figure 8 is a side elevation partly broken away and in section, showing one of the shaft carriers.

Figure 9 is a detail sectional view on line 9—9 of Fig. 8.

Figure 10 is a side elevation showing a different form of earth working device.

Figure 11 is an end elevation of the device shown in Fig. 10.

In the drawings above briefly described, the numerals 1 designate a pair of inclined handles which are connected at their front ends by a straight transverse bar 2. A pair of horizontally spaced arms 3 extend forwardly and downwardly from the bar 2, the rear ends of said arms being provided with enlarged heads 4 having transverse grooves 5 to receive the lower edge of the bar 2. A pair of clamping members 6 are disposed over the heads 4 and are formed with grooves 7 receiving the upper edge of the bar 2, appropriate bolts 8 being passed through said clamping members and heads so that when the bolts are tightened, the arms 3 will be frictionally clamped upon the bar 2. Loosening of the bolts 8 however, will permit lateral adjustment of the arms 3, as will be readily understood.

A pair of shaft carriers 9 are provided at the front ends of the arms 3. Each of these carriers is preferably of the construction shown more particularly in Figs. 8 and 9. In these views, the carrier 9 is shown as formed of a single casting having an upright plate-like portion 10 having spaced longitudinally disposed bearings 11 and 12 at its lower edge and provided also with a wheel spindle 13 projecting outwardly from the bearing 11. The upper edge of the plate 10 is curved and is provided with a laterally extending arched flange 14. Suitable wheels 15 are rotatably mounted upon the spindles 13 and are provided with beveled gears 16 which rotate under the flanges 14, so that the latter protect them against falling dirt from the wheels. The gears 16 mesh with pinions 17 on a pair of longitudinal shafts 18 whose rear ends carry suitable rotary implements to be hereinafter described. Preferably, the pinions 17 abut the front ends of the bearings 11 and collars 19 on the shafts 18, abut the rear ends of the bearings 12, so that the shafts are held against longitudinal sliding.

The shaft carriers 9 are pivotally and adjustably connected by bolts 20 with the front ends of the arms 3, said arms and carriers being provided with intermeshing teeth 21 to effectively hold them in adjusted position when the bolts 20 are tightened. It will be seen that by loosening these bolts and swinging the arms 3 upwardly or downwardly, the handles 1 may be set at any desired elevation. It may also be taken into consideration that by effecting the same adjustment, the carriers 9 may be made to incline the shafts 18 to a greater or smaller extent, as occasion may demand.

In most figures of the drawings, I have shown radial arms 22 projecting from hubs 23 which are detachably held upon the rear ends of the shafts 18, between nuts 24 and 25. These arms are effective for performing certain kinds of cultivation, but if desired, earth workers such as that disclosed in Figs. 10 and 11, may well be substituted. In these views, an elongated cylindrical hub or body 26 is shown provided with deeply pitched helical ribs 27 at its periphery, and short pins 28 project from said ribs at different points along their lengths. These pins will effectively work the earth along opposite sides of a row, when one of the hubs 26 is secured upon each of the shafts 18, and the helical ribs will effectively direct the loosened earth toward the row.

It will be seen from the foregoing that a simple and inexpensive hand cultivator has been provided, yet one which will be very efficient and desirable and may be readily adjusted to space the shafts 18 and their earth working implements, any desired distance apart.

Attention is also directed to the fact that a number of the parts are interchangeable, that the arms 22 of the front and rear earth workers are of different lengths to insure uniform penetration into the earth, that either or both arms 3 and all parts associated therewith may be bodily removed from the machine and attached for instance to a garden tractor and that the cultivator is a highly efficient device for stirring the ground thoroughly, as well as bringing fresh dirt to the plants. Also, it may again be stated that the cultivator may be used for numerous purposes, and it has been found particularly advantageous for working small vegetables such as onions and carrots, as well as for cultivating rows of flowering plants, for instance, gladiolas.

As excellent results are obtainable from the details disclosed, they are preferably followed, but within the scope of the invention as claimed, minor changes may of course be made.

I claim:—

1. A rotary cultivator comprising a pair of handles and a straight transverse bar connecting the front ends thereof, a pair of horizontally spaced arms projecting forwardly from said bar and means connecting said arms with said bar for adjustment along the length of the latter, a pair of vertically disposed shaft carriers to which the front ends of said arms are adjustably pivoted for vertical movement, said carriers having longitudinally disposed shaft bearings and laterally projecting wheel spindles, implement carrying shafts rotatable in said bearings and having pinions, and wheels on said spindles having gears meshing with said pinions.

2. A rotary cultivator comprising a pair of handles and a straight transverse bar connecting the front ends thereof, a pair of horizontally spaced arms projecting forwardly from said bar and having integral heads on their rear ends provided with grooves receiving portions of said bar, clamping members contacting with the side of the bar opposite that received in said grooves, bolts securing said clamping members to said heads for frictionally clamping the bar between said heads and clamping members, a pair of vertically disposed shaft carriers to which the front ends of said arms are adjustably pivoted for vertical movement, said carriers having longitudinally disposed shaft bearings and laterally projecting wheel spindles, implement carrying shafts rotatable in said bearings and having pinions, and wheels on said spindles having gears meshing with said pinions.

3. A structure as specified in claim 1, said shaft carriers having integral lateral flanges of arched form extending over said gears.

4. A device of the class described comprising an arm having an enlarged head at one end provided in one side with a transverse groove to receive one side of a carrying bar, a clamping member for application to the opposite side of said bar, a bolt connecting said clamping member with said head to frictionally clamp the arm to the bar, a vertically disposed shaft carrier adjustably pivoted on a horizontal axis to the other end of the arm, said carrier having a longitudinally disposed shaft bearing and a laterally projecting wheel spindle, a wheel rotatable on said spindle and having a gear, and an implement driving shaft rotatable in the bearing and provided with a pinion meshing with said gear.

5. A structure as specified in claim 4; said shaft-carrier having an integral laterally projecting flange extending over the upper portion of said gear.

In testimony whereof I have hereunto affixed my signature.

AUGUST JOSEPH TEDERS.